S. PLYMALE.
LUBRICATING DEVICE.
APPLICATION FILED OCT. 27, 1911.

1,043,141.

Patented Nov. 5, 1912.

WITNESSES
George Bambay.
L. J. Gallagher.

INVENTOR
Sebastian Plymale
BY Munn & Co
ATTORNEYS

UNITED STATES PATENT OFFICE.

SEBASTIAN PLYMALE, OF PORTLAND, OREGON.

LUBRICATING DEVICE.

1,043,141.  Specification of Letters Patent.  Patented Nov. 5, 1912.

Application filed October 27, 1911. Serial No. 657,021.

*To all whom it may concern:*

Be it known that I, SEBASTIAN PLYMALE, a citizen of the United States, and a resident of Portland, in the county of Multnomah and State of Oregon, have invented a new and Improved Lubricating Device, of which the following is a full, clear, and exact description.

My invention relates generally to lubricating devices, and more particularly is directed to a new and useful construction especially adapted for use on cars whereby the flanges of the car wheel may be lubricated when so desired in order to forestall loss of power due to friction when flanges and rail are dry, lessen wear on car wheels, track and guard rails, reduce liability of derailment of car, and reduce or prevent the noise caused by the slipping of wheels on the track, all when a car is rounding a curve.

The principal object of my invention is to provide a new and improved lubricating device adapted to lubricate the car wheel flanges when so desired, the device being moved into operative position by simple means within easy reach and control of a person in charge of the car as conductor or motorman.

A further object of the invention is to provide a new and improved construction of the class described which consists of few parts and which, by reason of its simplicity, is not easily deranged, the device operating in an efficient manner and the maintenance thereof involving small expense.

Other objects and advantages of the invention will appear as the description thereof proceeds, all of which is particularly pointed out and included in the appended claims.

Reference is to be had to the accompanying drawings forming a part of this specification in which similar characters of reference denote corresponding parts in all the views, and in which—

Figure 1:
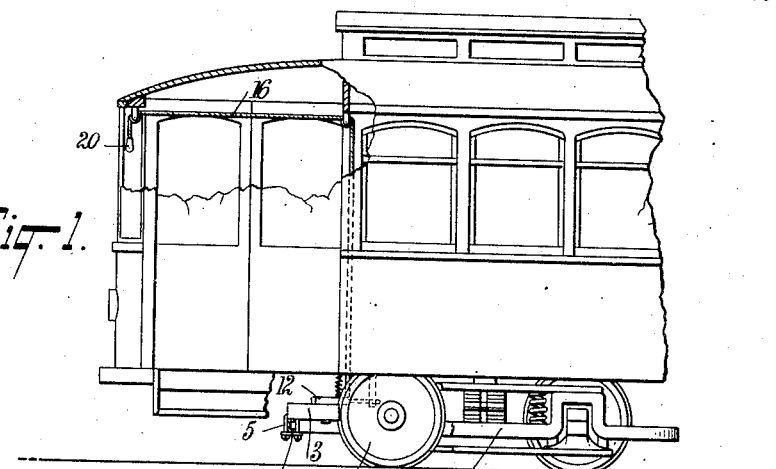
Figure 2:
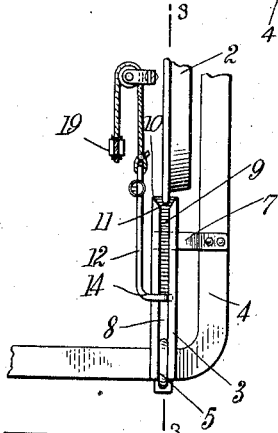
Figure 3:
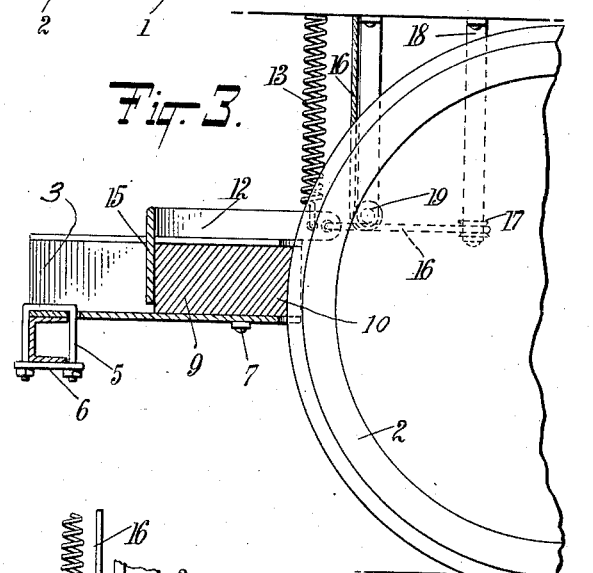
Figure 4:
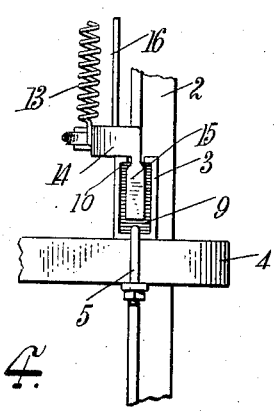

Figure 1 is a side view, partly in section, of one end of a street car fitted with my device; Fig. 2 is a partial plan view showing the device carried by the truck frame; Fig. 3 is a vertical sectional view on the line 3—3 of Fig. 2; Fig. 4 is an end view of the device showing the element therein for moving the lubricating compound into engagement with the wheel flange.

I have illustrated my attachment positioned on any suitable truck frame 1 and in connection with one of the wheels 2 thereon; the device may be attached to the trucks adjacent each wheel if so desired and all of the devices may be operated by a single means, if so desired, or those on one side of the truck may be independently operable from those on the other side, the devices which are moved into engagement with the flange of the wheel depending on whether the car is moving on a curve toward the right or left.

A suitable receptacle 3 is secured to one of the members 4 of the truck by any suitable means, preferably by a bolt 5 with a strap 6 thereon, the free end of the receptacle being held in position by means of an arm 7 extending from the member 4.

The receptacle is preferably of the shape shown in Figs. 2 and 3, being similar to a hollow rectangular body having a slot 8 extending longitudinally of its length, the opposite ends of the body being removed, as shown in Fig. 4. This receptacle is adapted to receive a suitable lubricant 9, preferably in cake form, and of such shape as to fit within the receptacle, one end of the lubricant extending without the receptacle, as at 10, and into engagement with the flange of the wheel 2. In order to provide for lubrication of opposite sides of the flange, the end of the receptacle where the lubricant extends therethrough is preferably beveled as at 11, in order to straddle the flange, thereby permitting the lubricant to contact with each side of the flange.

In order to urge the lubricant forwardly into engagement with the flange of the wheel I provide suitable means embodying a member 12 suitably suspended from the under side of the truck by means of a spring 13, this member being provided with an offset end 14 having an arm 15 extending therefrom and into the receptacle where it engages the lubricant.

The arm 15 is adapted to be actuated from the platform of the car and to this end I attach a suitable cord or chain 16 to the end of the body 12, this cord or chain passing around a suitable pulley 17, preferably supported on a post 18, and then around a pulley 19 in order to change the direction of motion, the cord or chain terminating in a handle 20 of suitable mass at either end of the car. The mass of the handle 20 is sufficient to keep the cord or chain 16 in position on the pulleys and to prevent it falling therefrom or becoming entangled with other mechanism of the car when it is in motion. As the car approaches a curve, the handle 20 is pulled downwardly, the arm 15 on the body member 12 then urging the lubricating cake 9 into engagement with the flange of the wheel 2, the various pulleys changing the direction of motion, and impressing the lubricant on both sides of the flange of the wheel from which it is transferred to the side on edge of the track rail and the guard rail respectively.

The use of this device does away with the necessity of applying some lubricant to the inside of the rails on curves, such practice leaving the street at these points in a dirty condition and injuring the clothes of pedestrians who happen to be passing these points.

The material of which the different parts of the device is made is largely a matter of choice and expediency, metal being preferably used in order to avoid unnecessary wear and tear, it being obvious, however, that various modifications of my device may be employed within the scope of expediency without departing from the spirit of the appended claims.

Having thus described my invention, I claim as new, and desire to secure by Letters Patent:—

1. A device of the class described comprising a hollow body having a slot extending throughout the length thereof, the said body being adapted to be secured to a car truck adjacent a wheel, the body containing a cake of suitable lubricant, the end of the body adjacent the flange of the wheel being beveled, the side walls of the said beveled portion lying on opposite sides of the flange of the wheel, a member movably supported adjacent the body, the member being provided with an offset end, an arm extending from the said end and passing through the said slot into engagement with the lubricant, together with means engaging the said member whereby the lubricant may be moved into engagement with the flange of the wheel in order to lubricate the same.

2. A device of the class described comprising a hollow body containing a cake of lubricant, the body being adapted to be positioned on a car truck adjacent a wheel, a slot extending throughout the length of the body, the end of the body nearest the wheel being beveled, the side walls of the beveled portion lying on opposite sides of the flange of the wheel, a member movably supported adjacent the body, the member having an offset end with an arm extending therefrom, the arm passing through the said slot into engagement with the lubricant, together with a cord and suitable pulleys, movement of which moves the arm and also the lubricant into engagement with the flange of the wheel in order to lubricate the same.

3. A device of the class described comprising a hollow body having a slot extending throughout the length thereof, the said body being adapted to be secured to a car truck adjacent a wheel, the said body containing a cake of suitable lubricant, a member slidably supported adjacent the body, the said member being provided with an offset end, an arm extending from the said end and passing through the slot in the said hollow body into engagement with the lubricant, a resilient device for suspending the said slidably supported member, together with means engaging the said member whereby the lubricant may be brought into engagement with the flange of the wheel to lubricate the same.

In testimony whereof I have signed my name to this specification in the presence of two subscribing witnesses.

SEBASTIAN PLYMALE.

Witnesses:
A. P. ARMSTRONG,
EARL C. McKINNON.